United States Patent
Stadler et al.

(10) Patent No.: US 6,973,851 B2
(45) Date of Patent: Dec. 13, 2005

(54) PULL-HANDLE ARRANGEMENT FOR RELEASING A FOOT-OPERATED PARKING BRAKE OF A MOTOR VEHICLE

(75) Inventors: Falk Stadler, Wildberg-Gültl (DE); Jürgen Bronner, Esslingen (DE); Ernst Franz, Filderstadt (DE)

(73) Assignee: DaimlerChrylser AG, Stuttgart (DE)

( * ) Notice: Subject to any disclaimer, the term of this patent is extended or adjusted under 35 U.S.C. 154(b) by 615 days.

(21) Appl. No.: 09/775,798

(22) Filed: Feb. 5, 2001

(65) Prior Publication Data

US 2001/0025544 A1 Oct. 4, 2001

(30) Foreign Application Priority Data

Feb. 5, 2000 (DE) .......................................... 100 05 244

(51) Int. Cl.[7] ................................................. F16C 1/16
(52) U.S. Cl. .............................. 74/502; 74/536; 74/538
(58) Field of Search ............................ 74/500.5, 501.6, 74/502, 512, 529, 536, 537, 538, 560

(56) References Cited

U.S. PATENT DOCUMENTS

| 2,751,054 | A | * | 6/1956 | Del Re, Sr. | 74/529 |
|---|---|---|---|---|---|
| 2,943,511 | A | * | 7/1960 | Johnstone | 74/529 |
| 2,945,571 | A | * | 7/1960 | Yanda | 74/502 |
| 2,957,354 | A | * | 10/1960 | Morrow | 74/502 |
| 3,117,466 | A | * | 1/1964 | Hinsey | 74/529 |
| 3,169,409 | A | * | 2/1965 | Babacz | 74/502 |
| 3,275,029 | A | * | 9/1966 | Wellman | 74/502 |
| 3,578,759 | A | * | 5/1971 | Yamazaki | 74/529 |

FOREIGN PATENT DOCUMENTS

| DE | 36 10 525 | of 1986 |
|---|---|---|
| DE | 40 33 666 | of 1990 |
| DE | 3935028 | 4/1991 |

\* cited by examiner

*Primary Examiner*—Chong H. Kim
(74) *Attorney, Agent, or Firm*—Crowell & Moring LLP

(57) ABSTRACT

Pull-handle arrangement for releasing a foot-operated parking brake of a motor vehicle. A pull-handle arrangement having a handle element which is held in a linearly movable manner in a handle mounting fixed on the vehicle and, with the aid of a cable, acts on the foot-operated parking brake, and also is in operative connection with a restoring spring of the foot-operated parking brake. Dampers which retard the return movement of the handle element are provided between the handle element and handle mounting.

10 Claims, 3 Drawing Sheets

PULL-HANDLE ARRANGEMENT FOR RELEASING A FOOT-OPERATED PARKING BRAKE OF A MOTOR VEHICLE

BACKGROUND AND SUMMARY OF THE INVENTION

This application claims the priority of German Application No. 100 05 244.4, filed in Germany on Feb. 5, 2000, the disclosure of which is expressly incorporated by reference herein.

The invention relates to a pull-handle arrangement for releasing the foot-operated parking brake of a motor vehicle, having a handle element which is held in a linearly movable manner in a handle mounting fixed on the vehicle and, with the aid of a pulling means, acts on the foot-operated parking brake, and also is in operative connection with a restoring spring of the foot-operated parking brake.

A pull-handle arrangement of this type is generally known from Mercedes Benz cars. The pull-handle arrangement is used for releasing a foot-operated parking brake, a handle element being provided which acts on the foot-operated parking brake by way of a Bowden cable. The handle element is held in a linearly movable manner in the region of the dashboard of the car in a handle mounting fixed to the vehicle, the pulling movement taking place rearwards approximately in the longitudinal direction of the vehicle. After the handle element has been pulled and the foot-operated parking brake released, the handle element is forcibly returned to the starting position by way of a restoring spring in the region of the foot-operated parking brake. This restoring movement may cause annoying noises to be produced. In addition, the mounting of the handle element has a relatively large amount of play giving an impression of inferior quality.

It is also known from German Patent Document DE 36 10 525 C2 in a foot-operated parking brake to use air damping to reduce the release impact of the pedal of the foot-operated parking brake.

German Patent Document DE 40 33 666 A1 discloses a further foot-operated parking brake, in which the restoring movement of the pedal is likewise damped. Fluid damping is provided here as a suitable measure.

The object of the invention is to provide a pull-handle arrangement of the type mentioned above, having an improved performance over the prior art.

This object is achieved by damping means which retard the return movement of the handle element provided between the handle element and the handle mounting. This solution according to the invention makes it possible to reduce, or virtually completely avoid, noises during the resetting of the handle element into the starting position. The handling of the pull-handle arrangement is more agreeable as a result and imparts an impression of superior quality.

In a preferred embodiment, the damping means are formed by an air-damping unit. This is a particularly simple and cost-effective refinement which also ensures virtually identical return properties for the handle element irrespective of temperature.

In a further embodiment, the handle mounting has rolling elements which bring about the linear movement of the handle element from opposite sides. As a result, an additional fixing of the handle element in the handle mounting is obtained, resulting in the handle element being able to move linearly in a virtually play-free manner. The impression of quality given by the pull-handle arrangement is further improved as a result.

In a further embodiment, the handle mounting is designed as a piston-sleeve guide. This is a particularly simple and functionally reliable refinement.

In a further embodiment, two mutually parallel guide pistons are arranged on the handle mounting which is fixed to the vehicle, and two corresponding guide sleeves are arranged on the handle element. This ensures that the handle element is able to be pulled linearly without also being able to rotate. The refinement ensures relatively precise linear guidance without much play.

In a further embodiment, impact-damping elements are assigned to those ends of the guide pistons which are positioned in the guide sleeves. This reduces the impact noise of the handle element against a part correspondingly fixed to the vehicle, in particular against the handle mounting. A compact construction can be obtained by integrating the impact-damping elements in the guide sleeves. The impact-damping elements may be fitted in the guide sleeves or on the guide pistons.

In a further embodiment, the air-damping unit is formed by regions of play and clearance sections between the guide pistons and guide sleeves. As a result, the air-damping unit is also integrated in the piston-sleeve guide and is therefore accommodated in a space-saving and invisible manner.

In a further embodiment, running surfaces whose contour is matched to the rolling elements are assigned to the rolling elements on the handle element. This further increases the guide precision of the handle mounting.

Other objects, advantages and novel features of the present invention will become apparent from the following detailed description of the invention when considered in conjunction with the accompanying drawings.

DETAILED DESCRIPTION OF THE DRAWINGS

Figure 1:
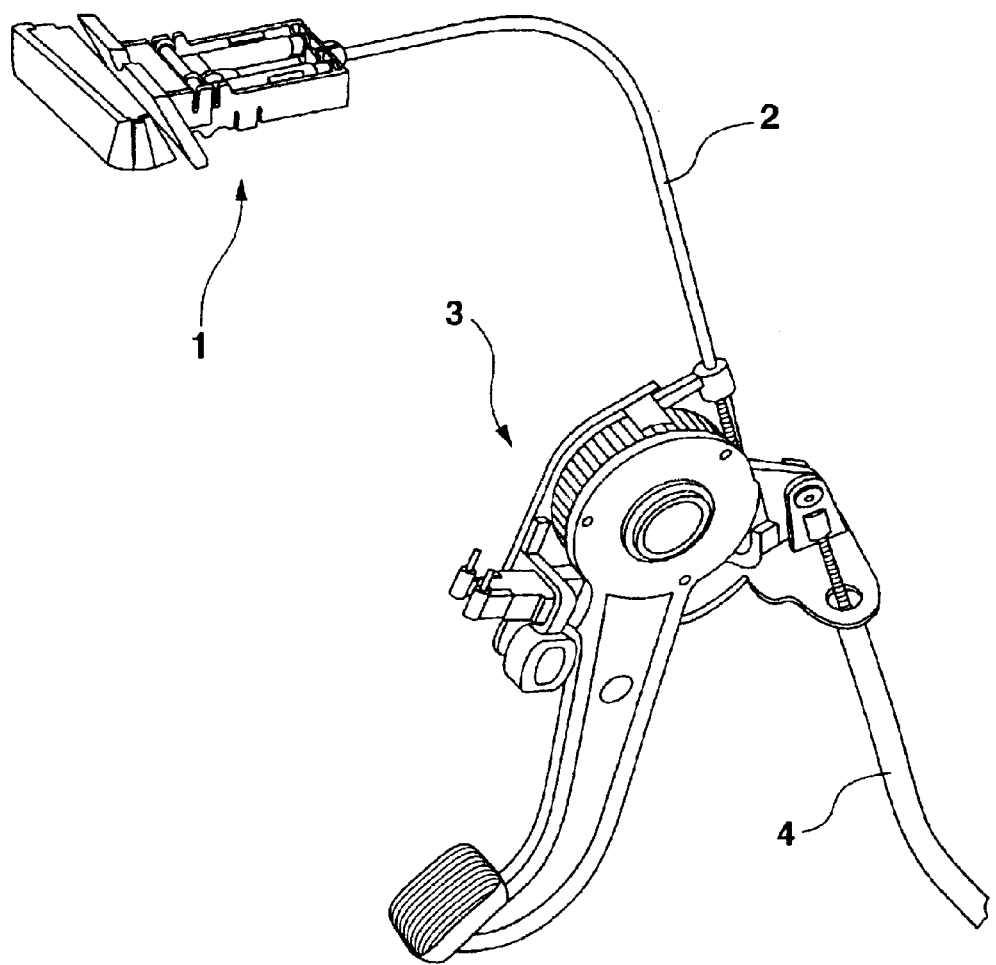
FIG. 1 shows a perspective illustration of an embodiment of a pull-handle arrangement according to the invention, which arrangement is assigned to a foot-operated parking brake of a car.

A foot-operated parking brake 3 according to FIG. 1 is intended for use in a car. The foot-operated parking brake 3, which is arranged in the interior of a car, acts on a brake cable 4 in a basically known manner. In order to release the foot-operated parking brake 3, a pull-handle arrangement 1 is provided which is arranged in the region of a dashboard, on the left-hand side of a steering wheel in the case of a left-hand drive vehicle. The pull-handle arrangement 1 acts via a pulling means in the form of a Bowden cable 2 on a corresponding blocking device of the foot-operated parking brake 3 so as to release the latter.

According to FIGS. 2 to 6 the pull-handle arrangement 1 has a handle element 6 on which one end of the Bowden cable 2 is held by way of a fastening lug 7. The handle element 6 is mounted in a linearly movable manner in a bearing housing 5, which forms part of a handle mounting. The bearing housing 5 is fixed on the dashboard, it preferably being integrated in the dashboard and held in a manner fixed to the vehicle. The Bowden cable 2, which leads to the fastening lug 7 of the handle element 6, penetrates a Bowden-cable bushing 8, which is open upwards in the form of a slot, on the bearing housing 5. The bearing housing 5 and also the handle element 6 are preferably produced from plastic.

For the linear guidance of the handle element 6 in the bearing housing 5, the handle element 6 has two guide sleeves 9 which are integrally formed on it, are parallel to each other and to which two corresponding guide pistons 10 on the bearing housing 5 are assigned. On a rear end, the guide pistons 10 each have an annular holding shoulder 11 by which the guide pistons 10 can be inserted in a form-locking and precisely-fitting manner into corresponding, upwardly open receiving pockets 12 on the bearing housing 5. When pressed into the receiving pockets 12, the guide pistons 10 are held securely in the bearing housing 5 and are aligned parallel to each other.

For the linear guidance of the handle element 6 relative to the bearing housing 5, the guide sleeves 9 are plugged onto the front ends 13 of the guide pistons 10 and can be slid relative to the latter. The two guide pistons 10 are each thickened cylindrically in the front end region. The diameter of these thickened end regions 13 are matched in a virtually identical manner to the inside diameter of the guide sleeves 9, resulting in relatively exact, linear sliding guidance. Those regions of the guide pistons 10 which are situated between these thickened end regions 13 and the holding shoulders 11 are reduced in diameter compared to the end regions 13, but are likewise of cylindrical design. This gives rise in this region, in the plugged-in state of the guide pistons 10, to an annular gap between the inner wall of the guide sleeves 9 and the associated guide piston 10, which annular gap is open towards the free end of each guide sleeve 9.

Figure 2:
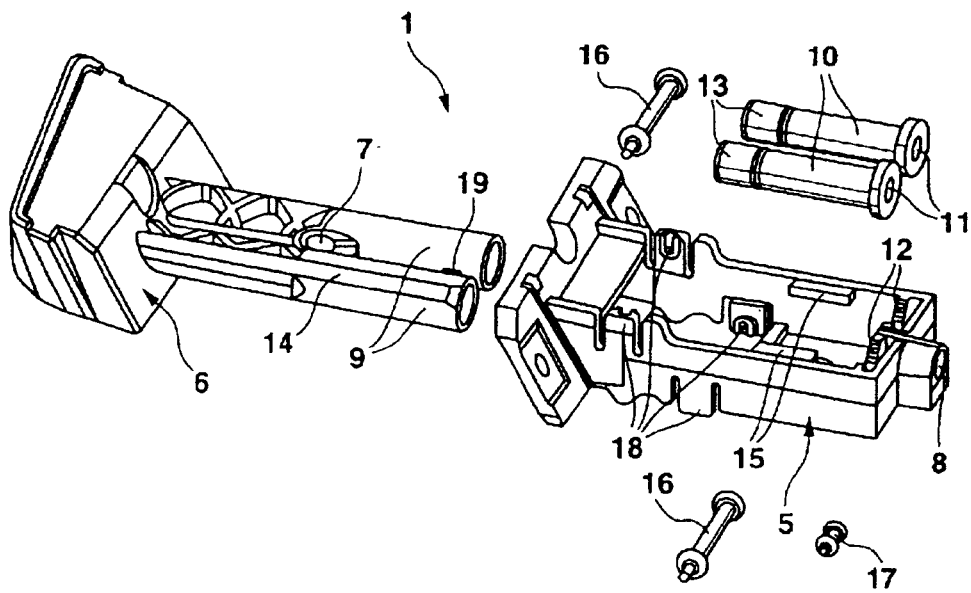
FIG. 2 shows an enlarged perspective exploded illustration of the pull-handle arrangement according to FIG. 1.
Figure 3:
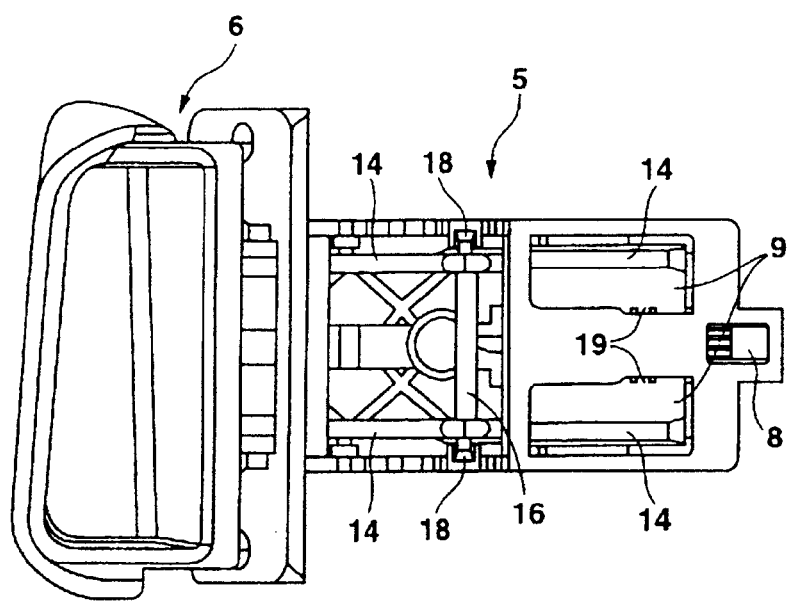
FIG. 3 shows a view from below of the handle arrangement according to FIGS. 1 and 2.
Figure 4:
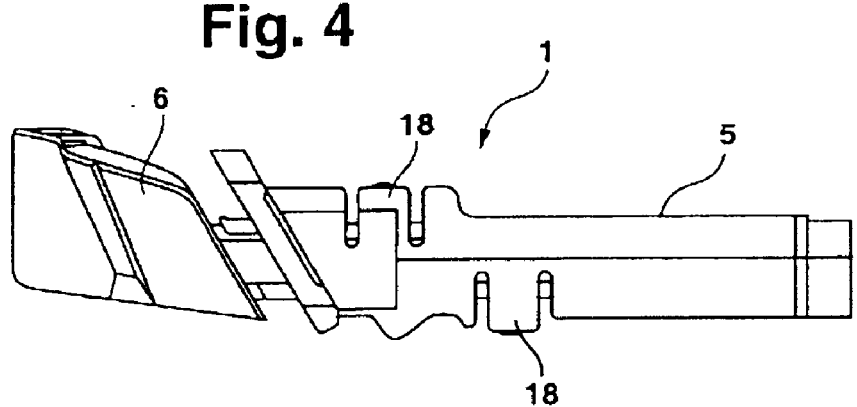
FIG. 4 shows a side view of the handle arrangement according to FIG. 3.
Figure 5:
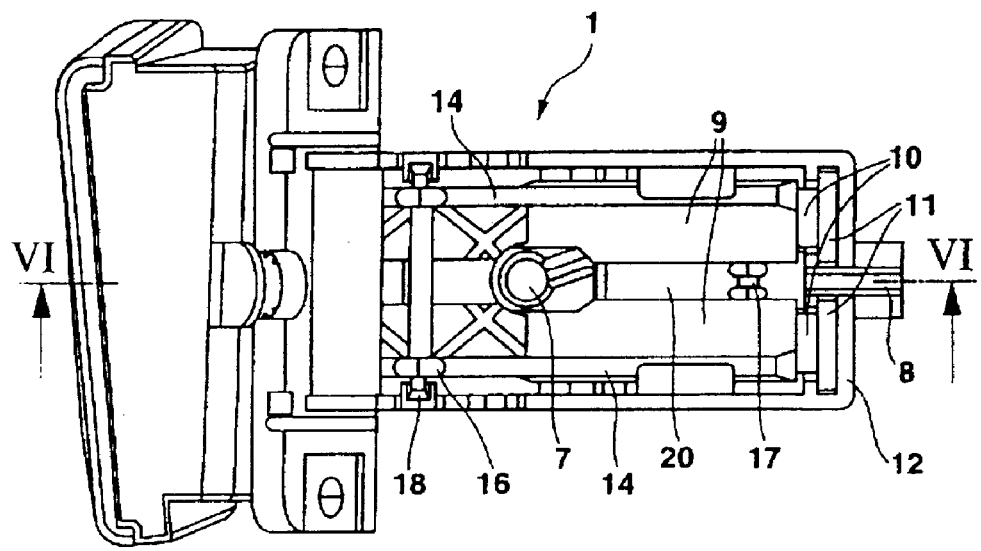
FIG. 5 shows a plan view of the handle arrangement according to FIGS. 3 and 4.
Figure 6:
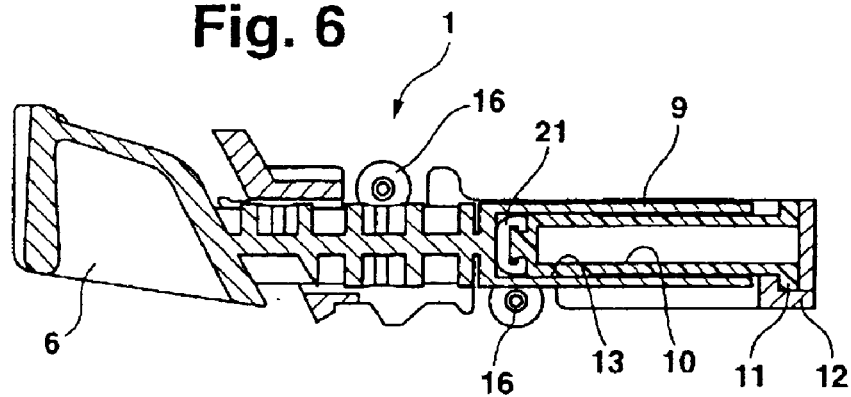
FIG. 6 shows a section through the handle arrangement according to FIG. 5 along the sectional line VI—VI in FIG. 5.

For the supplementary linear guidance of the handle element 6, in particular to further reduce the play during the sliding movement, a total of three rolling-element arrangements in the form of moving-roller pairs 16, 17 are provided. Two moving-roller pairs 16, 17 are positioned in the region of the lower side of the pull-handle arrangement 1 and one moving-roller pair 16 positioned in the region of the upper side of the pull-handle arrangement. A large moving-roller pair 16 supports the upper side and the lower side of the guide sleeves 9 of the handle element 6 in each case. To this end, two tongue-like bearing tabs 18 are provided, in each case, in the bearing housing 5, both in the region of the upper side and in the region of the lower side on opposite side walls of the frame-shaped bearing housing 5. The bearing tabs 18 are elastically compliant outwards and enable the moving-roller pairs 16 to be snapped in in a simple manner. Running-surface contours 14 are assigned to the two moving-roller pairs 16, both in the region of the upper side and in the region of the lower side of each guide sleeve 9, which contours can be readily seen by reference to FIGS. 2, 3 and 5. In addition, lateral supporting wedges 15 are also provided on the lateral frame walls of the bearing housing 5, in the region of the upper sides. The supporting wedges likewise act on the running-surface contours 14 and, in particular, prevent the holding shoulders 11 from moving upwards out of the receiving pockets 12, by securing the guide sleeves 9, which slide along the guide pistons 10, against moving out upwards. A small moving-roller pair 17 is also provided which, according to FIGS. 2 and 5, is inserted between the two guide sleeves 9 in the region of the mounting 19 and which is assigned a corresponding, planar running-surface contour 20 on the bottom of the bearing housing 5. The mounting 19 is also indicated with reference to FIG. 3. In this case, the moving-roller pair 17 runs along the web-shaped bottom section of the bearing housing 5. The moving-roller pair 17 is mounted by a latching connection between the guide sleeves 9.

The arrangement of guide sleeves 9 and guide pistons 10 is also used as an integrated air-damping unit by the sleeve space accommodating each guide piston 10 being designed as a clearance and being made longer than the effective piston length of each guide piston 10. The surfaces of the guide pistons 10 have an additional groove contour in order to obtain an improved flow performance for the compressed air. In addition, the outside diameters of the end regions 13 and the inside diameter of the guide sleeve 9 are matched to each other in such a manner that even in the region of the thickened end regions 13 there is still a narrow annular gap between the guide sleeve 9 and the guide piston 10. The result is that this annular gap is used in the manner of a constriction during the displacement of the handle element 6 relative to the bearing housing 5. The annular gap, which is enlarged compared to the narrow annular gap in the region of the thickened end regions 13, in the adjacent region between the guide piston 10 and guide sleeve 9 also contributes to the air-damping function.

The different gap sizes are matched to one another in such a manner that the pulling movement of the handle element 6 in order to release the foot-operated parking brake 3 is not noticeably increased because of corresponding counterforces of the air damping. In contrast to the returning force of the restoring spring of the foot-operated parking brake 3, which force pulls the handle element 6 back into the starting position, as is illustrated in FIGS. 3 to 6, the counterforces obtained by the described air damping are, on the other hand, great enough to draw the handle element 6 back relatively slowly into the starting position. In order to prevent the handle element 6 from a hard impact in the starting position, which would cause an annoying noise, an impact-damping element in the form of a rubber cushion 21 which interacts with the bottom end of the guide sleeve 9 is additionally provided on the end of each guide piston 10. The noise-causing impact of the end sides of the guide pistons 10 against the respective bottom of the cavity of each guide sleeve 9 is thereby avoided, so that the handle element 6 is automatically returned into its starting position in a virtually noise-free manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Pull-handle arrangement for releasing a foot-operated parking brake of a motor vehicle, having a handle element which is held in a linearly movable manner in a handle mounting fixed on the vehicle and with a pulling means acts on the foot-operated parking brake, said handle element being in operative connection with a restoring spring of the foot-operated parking brake, wherein damping means which retard a return movement of the handle element are provided between the handle element and the handle mounting, and wherein the damping means are formed by an air-damping unit.

2. Pull-handle arrangement for releasing a foot-operated parking brake of a motor vehicle, having a handle element which is held in a linearly movable manner in a handle mounting fixed on the vehicle and with a pulling means acts on the foot-operated parking brake, said handle element being in operative connection with a restoring spring of the foot-operated parking brake, wherein damping means which retard a return movement of the handle element are provided between the handle element and the handle mounting, and wherein the handle mounting has rolling elements which bring about the linear movement of the handle element from opposite sides.

3. Pull-handle arrangement for releasing a foot-operated parking brake of a motor vehicle, having a handle element which is held in a linearly movable manner in a handle mounting fixed on the vehicle and with a pulling means acts on the foot-operated parking brake, said handle element being in operative connection with a restoring spring of the foot-operated parking brake, wherein damping means which retard a return movement of the handle element are provided between the handle element and the handle mounting, and wherein the handle mounting is designed as a piston-sleeve guide.

4. Pull-handle arrangement according to claim 3, wherein two mutually parallel guide pistons are arranged on the handle mounting which is fixed to the vehicle, and two corresponding guide sleeves are arranged on the handle element.

5. Pull-handle arrangement according to claim 4, wherein impact-damping elements are provided at ends of the guide pistons which are positioned in the guide sleeves.

6. Pull-handle arrangement according to claim 5, wherein the impact-damping elements are produced from foam.

7. Pull-handle arrangement according to claim 1, wherein the air-damping unit is formed by regions of play and clearance sections between the guide pistons and guide sleeves.

8. Pull-handle arrangement according to claim 2, wherein running surfaces with a contour matched to the rolling elements are assigned to the rolling elements on the handle element.

9. A pull-handle assembly for releasing a foot operated parking brake of a motor vehicle, comprising:

a handle element acting on the foot-operated parking brake via a cable and being in operative connection with a restoring spring of the foot-operated parking brake;

a handle mounting, which is fixed on the vehicle, holding the handle element in a linearly movable manner; and damping means for retarding a return movement of the handle element being provided between the handle element and the handle mounting.

10. Pull-handle assembly according to claim 9, wherein two parallel guide pistons are arranged on the handle mounting and two corresponding guide sleeves are arranged on the handle element to form an air-damping unit.

* * * * *